United States Patent [19]
Hrytzak et al.

[11] 3,992,053
[45] Nov. 16, 1976

[54] SUN SHIELD FOR AUTOMOBILES

[76] Inventors: Lewis David Hrytzak; Clifford John Forward, both of Suite 206, Orchard Road 9, Shaw House, Singapore

[22] Filed: Sept. 26, 1974

[21] Appl. No.: 509,736

[30] Foreign Application Priority Data
Sept. 26, 1973 United Kingdom............... 45181/73

[52] U.S. Cl................................ 296/136; 135/5 A; 150/52 K
[51] Int. Cl.²......................................... B60J 11/00
[58] Field of Search............. 296/136, 98; 150/52 K; 135/1 A, 5 A; 160/236; 161/7, 165; 52/3, 4; 428/31

[56] References Cited
UNITED STATES PATENTS

| | | | |
|---|---|---|---|
| 1,639,474 | 8/1927 | Whitmore | 160/236 |
| 2,874,709 | 2/1959 | Cohen et al. | 296/136 X |
| 3,763,908 | 10/1973 | Norman | 150/52 K |
| 3,785,697 | 1/1974 | Dabbs | 296/136 |

FOREIGN PATENTS OR APPLICATIONS

| | | | |
|---|---|---|---|
| 2,053,396 | 5/1972 | Germany | 296/136 |
| 1,907,125 | 9/1970 | Germany | 296/136 |
| 542,853 | 5/1956 | Italy | 296/136 |
| 608,465 | 9/1960 | Italy | 135/5 A |

Primary Examiner—L. J. Raperner
Assistant Examiner—Donald W. Underwood
Attorney, Agent, or Firm—Wenderoth, Lind & Ponack

[57] ABSTRACT

The sun shield comprises a strip of screening material which is stored on a roller within a cylindrical container attached to the automobile. When in use, the material is drawn out of the container through a slit therein, and is pulled over the automobile and attached at its free end to the automobile so that the roof is shielded. The screening material is kept spaced from the automobile bodywork by means of legs which fold up when the sun shield is stored.

9 Claims, 5 Drawing Figures

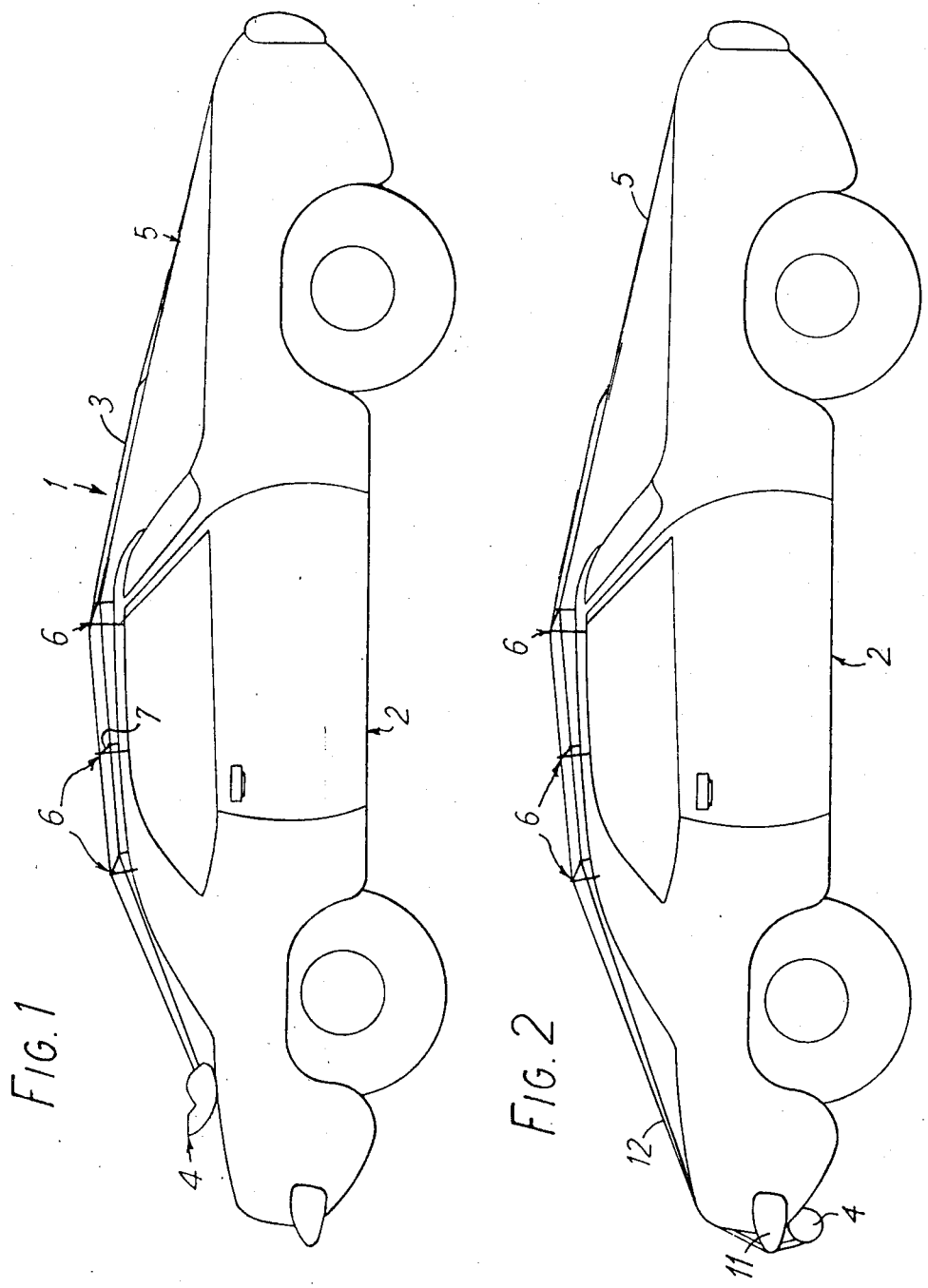

SUN SHIELD FOR AUTOMOBILES

This invention relates to a sun shield for automobiles.

The invention is concerned with providing means whereby the vehicle, while stationary, is shaded from the unpleasant and damaging effects of the sun's rays. Thus the interior of the vehicle is kept at a reasonable temperature, thereby preventing discomfort to the vehicle occupants when the vehicle is entered, and possible damage to upholstery and expensive electrical equipment, such as radios, due to excessive heat. Although useful in all countries of the world, it is anticipated that a sun shield will be found particularly useful in hot countries where the effect of the sun on parked vehicles is particularly noticeable.

According to the invention there is provided a sun shield for automobiles comprising a strip of screening material for extending over an automobile to form a canopy, a roller for mounting on the bodywork of the automobile and onto which said screening material may be wound and means attached to said screening material for spacing said material, when extended, from the bodywork of the automobile.

The roller is preferably located at the rear of the automobile and may, for example, be mounted on the trunk lid of the automobile, under the rear bumper or inside the trunk itself. The roller then extends transversely of the length to the automobile, the screening material being unwound therefrom when required, and pulled forward over the roof of the automobile and attached near the front of the automobile.

With the roller mounted at any of the locations specified above, the screening material will only require spacing from the vehicle bodywork as it passes over the roof and possibly the front and rear windows of the automobile. Such spacing is essential if full protection from the heat of the sun is to be obtained, since circulation of air under the canopy is essential to keep the automobile cool.

In an embodiment of the invention the spacing means comprises a leg attached at one end to a lateral edge of the screening material and adapted, when in use, to extend at right angles to the material and bear against the automobile bodywork at the other end thereof. Preferably, a plurality of legs arranged in pairs are provided, the respective legs of each pair taking up corresponding positions at the opposite lateral edges of the material. When the canopy is wound onto the roller, the legs merely fold up against the canopy and roll up with it. If more than one pair of legs is fitted, the respective pairs are spaced apart along the length of the strip of screening material. In a preferred embodiment of the invention the respective legs of each pair are joined by a strengthening strip extending across the material between the legs. The legs may then be hinged onto the strengthening strip to provide the necessary folding action.

The distance between the respective legs of each pair may be such that the legs, when folded out, sit in the rain gutter of the automobile. Alternatively, suction pads may be provided on the free ends of the legs for detachably securing the legs to the roof or other part of the automobile.

The strip of screening material need only be of such a length that the passenger compartment of the automobile is shaded from the sun. The strip may be continued at one or both ends by cords or strips of suitable material, for example nylon. If such cords or strips are fixed to the outer end of the strip of screening material they may be used to affix the strip, when extended, to the front of the automobile. If they are fixed to the inner end of the strip, then they will be attached to the roller so that they are rolled up with the canopy.

The roller may be spring loaded, so that, when the canopy is released, it automatically retracts. Alternatively the roller may be rotated to draw in the canopy by means of a handle or electric motor operated from the automobile battery. In a still further alternative the roller may be rotated to retract the canopy by means of a draw cord. The draw cord is arranged to be wound up as the canopy is pulled out. To retract the canopy the draw cord is pulled to rotate the roller in the opposite direction.

It will be clear that, due to aesthetic and safety considerations, the roller cannot be longer than the width of the automobile on which it is to be mounted. Thus the width of the strip of screening material will normally be limited to less than the width of the automobile with the result that the side windows are not shaded. This being the case, a preferred embodiment of the invention provides a pair of side screens which, during use, extend downwardly from the lateral edges of the screening material to cover or at least partially cover the side windows. Preferably the upper area of each said side screen, closest to the canopy, is formed with an open weave material so that air circulation between the canopy and roof of the automobile is not impeded. The lower parts of the side screens are formed from the same material as the main part of the canopy. When the canopy is to be retracted, the side screens are folded up over the canopy and are thus rolled up with the canopy.

If desired the roller may be housed in a generally cylindrical container, having an elongated slit along a generator thereof for passage of the canopy and side screens (if fitted). If the roller is to be mounted externally of the automobile, the cross section of the container may be aerodynamically shaped for minimum wind resistance.

In order that the invention may be better understood, several embodiments thereof will now be described by way of example only and with reference to the accompanying drawings in which:

FIG. 1 is a side view of one embodiment of a sun shield according to the invention fitted to an automobile; and FIG. 2 is a side view of a second embodiment of the invention.

Figure 3:
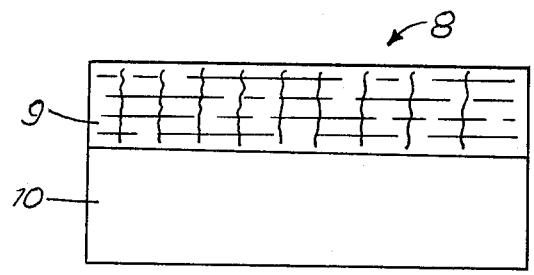
FIG. 3 is a side view of a side screen of the present invention.

Referring to FIG. 1, there is shown a sun shield 1 according to the present invention extended across an automobile 2. The sun shield comprises a strip 3 of canvas-like screening material which is retractable when not in use into a container 4 fixedly mounted onto the trunk lid or slightly ahead of it. The container is aerodynamically shaped somewhat in the manner of an aircraft wing, with a rounded front edge and a tapered rear edge. This is found to give minimum wind resistance. The container is permanently attached to the automobile 2 by being supported a few inches above the bodywork on suitable brackets of chrome, aluminium or some other rustproof metal. It may be tilted according to the desire of the owner in order to achieve the best effect both aesthetically and aerodynamically. The container 4 has a roller (not shown) mounted therein onto which the strip 3 is rolled. The roller is spring loaded so that it automatically retracts the strip 3 when the latter is released.

The strip 3 extends over the roof of the car and part way over the hood. A pair of nylon cords 5 continue the strip to its attachment point or points at a convenient point on the bodywork of the car near the front (for example the front bumper or grill). The cords 5 ensure that the screening material is stretched out taut to thus form a canopy over the automobile. The canopy is provided with three pairs of fold-up legs 6 which sit in the rain guter and hold the canopy above the roof of the car with a spacing of six to eight inches. A lateral bracing of light aluminium channel section 7 is provided between each pair of legs 6. The legs 6 are hingedly connected to each end of the channel section 7 so that they will fold flat when the sun shield is packed in the container 4.

Figure 4:
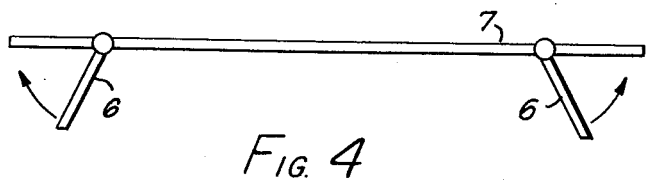
FIG. 4 is a schematic side view of one channel section with the legs hinged thereto.
Figure 5:
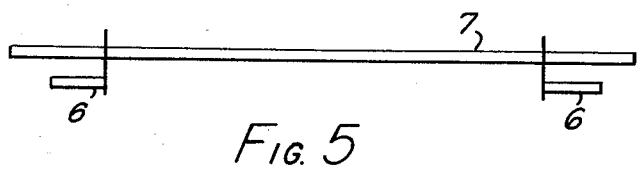
FIG. 5 is a schematic top view of the channel section and hinged legs of FIG. 4.

As shown in FIGS. 4 and 5, the legs 6,6 extend downward to support the channel 7 above the roof of the car, and the legs 6,6 fold flat against the channel 7 when the channel is rolled up in the container 4.

The upwardly facing surface of the strip 3 is coloured white or silver or other light colour in order to reflect as much heat as possible. Similarly, the underside of the strip 3 is coloured with a dark colour, e.g. black, to absorb any heat which is reflected upwards off adjacent objects and the road.

A pair of side screens 8 hang down from each of the lateral edges of the strip 3 in order to cover the side windows and hence protect the interior of the car from the sun's rays coming down at a slant. One of these side screens is shown, in FIG. 3. Each side screen comprises an upper part 9 having an open mesh and a lower part 10 of the same material as the strip 3. The width of part 9 is dependant on the spacing between the canopy and the roof of the automobile, and is sized in order to ensure adequate air circulation of the space beneath the canopy. The width of the whole side screen is such that it will hang down to the level of the door handles and thus provide shade for the whole of the side windows. Before retracting the canopy into the container 4, the side screens 8 are folded up over the strip 3, and are then rolled up with the remainder of the canopy.

It should be noted that, with certain types of automobile, further pairs of legs 6 may be needed in order to ensure spacing from such parts as the rear window and windscreen. Such legs are preferably provided with suction pads in order to avoid damage to the glass.

In a second embodiment of the invention, shown in FIG. 2, the container 4 is mounted beneath the rear bumper 11 of the automobile. Thus, when not in use, the container and canopy are hidden from view. In this embodiment, the strip 3 is not itself attached to the roller within container 4, but to three strong straps 12, for example of nylon, which are in turn fastened to the roller so that, when the roller is turned, the straps are rolled up with the remainder of the canopy.

As with the embodiment of FIG. 1, the upper and lower faces of the canopy may be suitably coloured to respectively reflect and absorb heat incident upon it. Furthermore a pair of side screens 8 may also be provided to cover the side windows of the automobile.

In a third embodiment of the device, not shown, the roller is mounted in the trunk of the car. To withdraw the canopy, the trunk lid is first opened and the strip 3 withdrawn over the automobile in the manner described previously. When the canopy has been attached at the front of the automobile, the trunk lid is closed and locked. As with the embodiment described with reference to FIG. 2, it may be preferable to provide straps 12 at the rear end of the strip, which straps roll up with the remainder of the canopy. Furthermore, depending upon the shape of the particular automobile, it may be necessary to provide one or more additional pairs of legs 6 equipped with rubber suction pads to hold the screening material away from the rear window.

We claim:

1. A sun shielding apparatus for use on an automobile and the like, comprising:
   screening material means for extending over and forming a canopy above said automobile;
   roller means mounted on said automobile and attached to one end of said screening material means for winding said screening material means thereon; and
   collapsible spacing means attached to said screening means and windable with said screening means about said roller means for spacing said screening material means above said automobile when unwound from said roller means, said spacing means being comprised of:
   a plurality of stiffening braces attached to and extending laterally across said screen material means on the side thereof adjacent said automobile, and
   a plurality of support legs hingedly fixed to each stiffening brace and hingeable downward against said automobile for spacing said stiffening braces and said screening material means attached thereto above the automobile and hingeable upward against said stiffening braces for being rolled up with said screening material means when said screening material means is rolled about said roller means.

2. A sun shielding apparatus as claimed in claim 1 wherein said roller means is mounted on the exterior surface of the trunk lid of said automobile.

3. A sun shielding apparatus as claimed in claim 1 wherein said roller means is mounted beneath the rear bumper of said automobile.

4. A sun shielding apparatus as claimed in claim 1 wherein said roller means is comprised of:
   a generally cylindrical container having an elongated slit therein mounted on said automobile; and
   a roller mounted within said cylindrical container connected to said screening material means through said elongated slit.

5. A sun shielding apparatus as claimed in claim 1 wherein said screening material means is comprised of:
   screening material; and
   cords or strips attached to said screening material at one end and to said roller means at the other end.

6. A sun shielding apparatus as claimed in claim 1 further comprising side shielding screens attached to said screening material means and extending downward over at least a portion of the side windows of said automobile.

7. A sun shielding apparatus as claimed in claim 6 wherein said side shielding screens are comprised of an upper portion of open weave material attached to the lateral edge of said screening material means, and a lower portion of screening material attached to the upper portion and extending downward therefrom over at least a portion of the side windows of said automobile.

8. A sun shielding apparatus as claimed in claim 1 wherein the upper surface of said screening material means is a light color, whereby the heat from the sun is reflected away therefrom.

9. A sun shielding apparatus as claimed in claim 1 wherein the under surface of said screening material means is a dark color, whereby heat reflected beneath said screening material means is absorbed.

* * * * *